Sept. 17, 1940.  D. McNETT  2,214,969
HOG TRAP
Filed Sept. 29, 1939
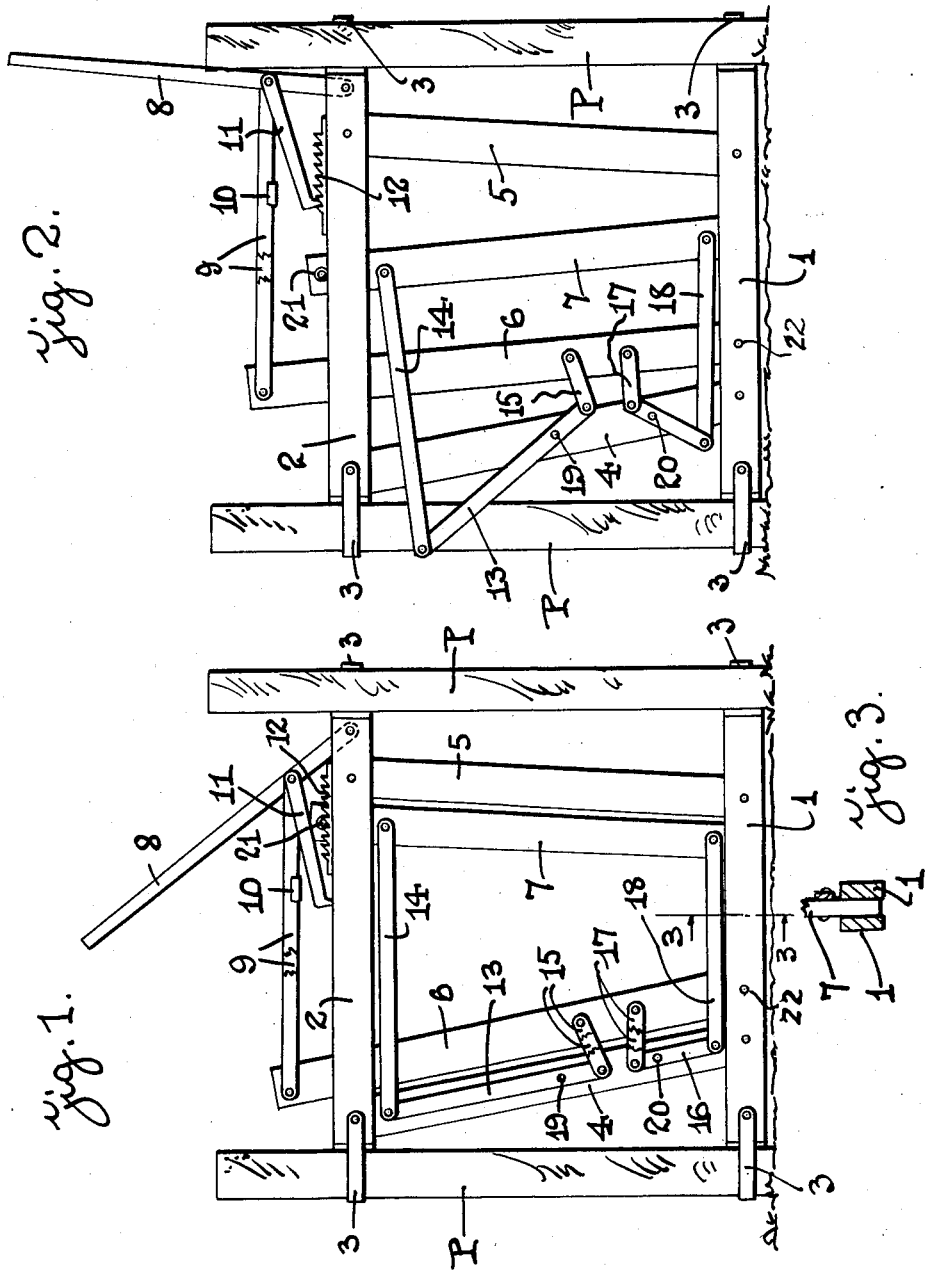
Inventor
Donald McNett
By Lester L. Sargent
Attorney Patented Sept. 17, 1940

2,214,969

UNITED STATES PATENT OFFICE 2,214,969

HOG TRAP

Donald McNett, Darlington, Wis.

Application September 29, 1939, Serial No. 297,157

2 Claims. (Cl. 119—98)

The object of my invention is to provide a device for catching and holding hogs for the purpose of putting rings in the nose, castrating, worming, branding or other operation; to provide an efficient and easily operated device which can be erected at small cost, and which is durable and useful for the purposes intended.

I attain these and other objects of my invention by the mechanism illustrated in the accompanying drawing, in which—

Figure 1 is a front elevation of my device showing it in open position;

Fig. 2 is a front elevational view of the device in closed position, after hand lever 8 has been operated; and Fig. 3 is a vertical section on line 3—3 of Fig. 1.

Referring to the drawing, parallel lower frame members 1 are spaced approximately two inches apart and affixed at each end to gate posts P by L-shaped bolts 3. Parallel upper frame members 2 are provided, between which the trapping mechanism operates and to which the upper ends of stationary bars 4 and 5 are rigidly affixed by suitable means such as spikes or bolts. A swingable clamping bar 6 is pivoted at its lower end at 22 to lower frame members 1, and is loosely mounted between the upper frame members 2 and movable therein, and to this bar one end of double links 15 and 17 and link 9 are riveted. The cooperating slidable clamping bar 7, to which the ends of metal links 14 and 18 are pivoted, carries at its top a roller 21 by which it is rollably supported on one of the upper frame members 2, and on which it moves to and fro when the device is operated.

The mechanism of my device is manually operated by a hand lever 8 which is pivotally mounted on bars 2. Affixed to hand lever 8 is a double link 9 on which is mounted a pawl hanger or rest 10. A pawl 11 is attached to hand lever 8 and engages in rack 12 to hold the clamping bars in the desired position engaging the neck of the hog. An upper steel lever 13 is pivotally connected to short double link 15 at its lower end, and is pivotally connected to horizontal link 14 at its upper end. The lever 13 is pivotally connected to stationary bar 4 by pivot 19 offset from the center of bar 13. A lower lever 16 is pivotally connected at its upper end to one end of short double link 17 and at its lower end to one end of horizontal lower link 18. Lower lever 16 is pivotally affixed to stationary member 4, by pivot 20 at a point offset from the center of bar 16.

When it is desired to trap a hog for any of the purposes described, when the animal's head has entered the space between clamping bars 6 and 7, as shown in Fig. 1, hand lever 8 is swung outwardly to the position shown in Fig. 2, which causes double link 9 to pull clamping bar 6 inwardly toward bar 7. As clamping bar 6 moves, this member in turn operates short double links 15 and 17, pivoted upper lever 13, pivoted lower lever 16 and horizontal links 14 and 18 simultaneously, forcing cooperating clamping bars 6 and 7 toward each other to the desired position to catch and hold the head of the hog. The bars are held in that position by pawl 11 seating in the rack 12, as shown in Fig. 2.

To release the hog, hand lever 8 is moved in a downward direction, after releasing the pawl 11 from the rack 12.

My hog trap may be erected by any small gate or doorway, and a suitable chute to direct the hogs to the trap can be made by putting two conventional small gates up to the inside of the frame pieces 4 and 5, or a suitable permanent chute may be made by making a frame like the outside frame of the trap and nailing the two together with one inch boards about five feet long. When a hog enters the chute it must go into the trap, as it cannot turn around. When the hog is released it passes on through the trap and another enters.

What I claim is:

1. In a hog trap, the combination of spaced posts, a pair of parallel spaced lower frame members secured to the posts, a pair of upper spaced parallel frame members secured to the posts, bars spaced from the posts and extending between and affixed to the upper and lower frame members, a slidable clamping bar loosely mounted between the upper and lower frame members and rollably supported on one of the upper frame members, a cooperating swingable clamping bar pivoted at its lower end to the lower frame bars and swingable at its upper end, a pivoted lever linked to the upper end of said swingable pivoted bar to swing it toward the first mentioned clamping bar, a pawl attached to said lever, a ratchet mounted on one of the upper frame bars and engageable by said pawl to hold the clamping bars fixed in the position to which they are moved, and means operatively connecting the swingable clamping bar and the sliding clamping bar, whereby operation of the swingable clamping bar toward the closed position will pull the slidable clamping bar in a reverse direction toward it.

2. In a hog trap, the combination of spaced posts, a pair of parallel spaced lower frame members secured to the posts, a pair of upper spaced parallel frame members secured to the posts, bars spaced from the posts and extending between and affixed to the upper and lower frame members, a slidable clamping bar loosely mounted between the upper and lower frame members and rollably supported on one of the upper frame members, a cooperating swingable clamping bar pivoted at its lower end to the lower frame bars and swingable at its upper end, a pivoted lever linked to the upper end of said swingable pivoted bar to swing it toward the first-mentioned clamping bar, a pawl attached to said lever, a ratchet mounted on one of the upper frame bars and engageable by said pawl to hold the clamping bars fixed in the position to which they are moved, short links pivotally connected to the swingable bar, pivoted levers to which the links are respectively connected, said levers being pivoted at a point offset from center, and horizontal links operatively connecting the other ends of said levers with the slidable bar whereby the forward movement of the swingable bar will operate the pivoted levers to move the slidable bar toward the swingable clamping bar.

DONALD McNETT.